United States Patent
Jangbarwala

(10) Patent No.: US 7,048,857 B2
(45) Date of Patent: May 23, 2006

(54) METHOD AND APPARATUS FOR METAL REMOVAL ION EXCHANGE

(75) Inventor: Juzer Jangbarwala, Chino Hill, CA (US)

(73) Assignee: The BOC Group, Inc., Murray Hill, NJ (US)

( * ) Notice: Subject to any disclaimer, the term of this patent is extended or adjusted under 35 U.S.C. 154(b) by 620 days.

(21) Appl. No.: 10/169,316

(22) PCT Filed: Jan. 3, 2001

(86) PCT No.: PCT/US01/00174

§ 371 (c)(1),
(2), (4) Date: Sep. 23, 2002

(87) PCT Pub. No.: WO01/49389

PCT Pub. Date: Jul. 12, 2001

(65) Prior Publication Data

US 2003/0044335 A1     Mar. 6, 2003

Related U.S. Application Data

(60) Provisional application No. 60/174,469, filed on Jan. 3, 2000.

(51) Int. Cl.
*B01D 15/04*     (2006.01)
*C01G 3/00*     (2006.01)

(52) U.S. Cl. ............... 210/652; 210/668; 210/670; 210/688; 210/748; 210/758; 210/205; 210/275; 210/912; 423/24

(58) Field of Classification Search ............... 210/652, 210/663, 668, 670, 681, 688, 748, 757, 758, 210/912, 198.1, 205, 209, 263, 269, 275, 210/277, 653; 423/24, 63, 70, 100, 112, 423/139, 157, 181
See application file for complete search history.

(56) References Cited

U.S. PATENT DOCUMENTS

| | | | | | |
|---|---|---|---|---|---|
| 2,733,204 | A | * | 1/1956 | Costa | 210/670 |
| 3,186,952 | A | * | 6/1965 | Brubaker et al. | 423/24 |
| 3,870,033 | A | * | 3/1975 | Faylor et al. | 392/470 |
| 3,920,544 | A | * | 11/1975 | Weiss | 210/675 |
| 3,961,029 | A | * | 6/1976 | Senoo | 423/54 |
| 4,145,281 | A | | 3/1979 | Weishaar et al. | |
| 4,176,056 | A | * | 11/1979 | Grier | 210/661 |
| 4,221,871 | A | | 9/1980 | Meitzner et al. | |

(Continued)

FOREIGN PATENT DOCUMENTS

GB     2.125.416 A     3/1984

(Continued)

*Primary Examiner*—Fred G. Prince
(74) *Attorney, Agent, or Firm*—David A. Hey

(57) ABSTRACT

The present invention provides a method for selectively removing metal ions of interest from a solution (12), such as the wastewater from a chemical mechanical polishing process. The method comprises contacting a solution (12) containing solid particles, an oxidizing agent and a first concentration of the metal ions with an ion-exchange resin (20), such as a crosslinked poly-4-v resin, that is resistant to damage by the oxidizing agent and that is operative when in contact with the solution (12) to exchange selected ones of the metal ions in the solution for selected preferred ions in the ion-exchange resin thereby to produce a treated solution (22) having a second concentration of the metal ions that is lower than the first concentration. The present invention also relates to an apparatus (100) and system (500) for use with the method of the present invention.

38 Claims, 11 Drawing Sheets

U.S. PATENT DOCUMENTS

| | | | |
|---|---|---|---|
| 4,806,236 A * | 2/1989 | McCormack | 210/94 |
| 4,895,659 A * | 1/1990 | Semmens et al. | 210/638 |
| 5,002,645 A * | 3/1991 | Eastland, Jr. et al. | 204/157.42 |
| 5,118,716 A * | 6/1992 | Arsenault | 521/33 |
| 5,281,631 A | 1/1994 | Horwitz et al. | |
| 5,372,794 A | 12/1994 | LeMaire et al. | |
| 5,409,680 A * | 4/1995 | Kaczur et al. | 423/157 |
| 5,409,822 A | 4/1995 | Scott et al. | |
| 5,449,462 A | 9/1995 | Horwitz et al. | |
| 5,538,644 A * | 7/1996 | Kozak et al. | 210/669 |
| 5,539,003 A | 7/1996 | Horwitz et al. | |
| RE35,370 E * | 11/1996 | Henry | 73/40.7 |
| 5,651,894 A * | 7/1997 | Boyce et al. | 210/652 |
| 5,670,550 A * | 9/1997 | Jarvinen et al. | 521/32 |
| 5,766,438 A * | 6/1998 | Ishibashi et al. | 204/520 |
| 5,811,012 A * | 9/1998 | Tanabe et al. | 210/669 |
| 5,908,557 A | 6/1999 | Smith et al. | |
| 5,951,874 A * | 9/1999 | Jangbarwala et al. | 210/662 |
| 5,958,245 A * | 9/1999 | Martin et al. | 210/652 |
| 2003/0196966 A1 * | 10/2003 | Hughes | 210/758 |
| 2003/0206846 A1 * | 11/2003 | Jangbarwala | 423/241 |

FOREIGN PATENT DOCUMENTS

| | | | |
|---|---|---|---|
| JP | 55-39277 | * | 3/1980 |

* cited by examiner

METHOD AND APPARATUS FOR METAL REMOVAL ION EXCHANGE

The present application is a 35 U.S.C. 371 national stage application of international application PCT/US01/00174, filed Jan. 3, 2001, and claims the benefit of U.S. Provisional Application No. 60/174,469, filed Jan. 3, 2000.

FIELD OF THE INVENTION

The present invention generally relates to the removal of transition and heavy metal ions from an industrial waste stream. More particularly, the present invention is directed to the removal of copper ions from a waste stream generated during semiconductor manufacture. Specifically, the present invention relates to a novel method for removing copper from solution, and an apparatus for use therewith. Additionally, the present invention includes methods and apparatus for treating and processing industrial waste streams from which copper has been removed according to the method of the present invention.

BACKGROUND OF THE INVENTION

The semiconductor industry is continually seeking new ways for improving and increasing the speed of integrated circuits. One method currently employed by the semiconductor industry is the process of making copper interconnects on integrated circuits, rather than the former method of using aluminum interconnects. Copper interconnects provide the advantages of faster speed and better heat dissipation in integrated circuits. The use of copper, however, presents certain problems in the fabrication process. In particular, the wastewater generated from the fabrication process contains copper instead of aluminum, making the wastewater toxic.

The process to create copper interconnects has the following basic overall steps. First, copper is electroplated in and over the trenches of the integrated circuit. The excess copper (outside of the trenches) is removed with a process termed Chemical Mechanical Polishing (CMP). CMP is a hybrid process where copper is polished off the wafer by a combination of chemical etching and physical polishing by fine aluminum oxide slurry. The particle size distribution of the slurry ranges generally from 0.02 micron (200 Angstroms) to 0.10 micron (1000 Angstroms). The rinsing wastes from both of these processes contain variable amounts of dissolved copper.

The rinsewater from the electroplating process is very similar to rinsewater found in plating and circuit shops where copper is plated on metals and circuit boards. In particular, the rinsewater contains dissolved copper salts such as $CuSO_4$, dilute acid, surfactants and dilute levels of other organic and inorganic enhancing agents. The rinsewater from the CMP process contains solids, chelating agents and oxidizers, and presents a significant challenge for waste disposal efforts.

The primary goal for waste disposal of the rinsewater from the CMP process is the removal of copper from the waste stream, without requiring the removal of the solids or oxidizing agents. While ion-exchange is an efficient technology to achieve copper removal, conventional ion-exchange resins would be damaged irreversibly when oxidizers are present. Further, flow patterns of conventional resin columns would cause the solids present in the rinsewater to plug the columns. Additionally, while activated carbon is often used to eliminate oxidizers because it acts as a good reducing agent, the pores of activated carbon particles are susceptible to plugging due to the particle size distribution of the CMP slurry waste.

Accordingly, there remains a need to provide a new and improved method for removing copper present in industrial wastewater streams, and in CMP slurry in particular. There is a further need for unique materials and methodologies for abatement of copper and/or recycling of the wastewater from industrial chemical processes. Additionally, there is a need for an apparatus for use with the methods of the present invention for the removal of copper and the treatment and processing of wastewater from copper CMP manufacturing processes. The present invention is directed to meeting these needs.

SUMMARY OF THE INVENTION

It is an object of the present invention to provide a new and useful method for removing transition and heavy metals from waste generated by industrial processes.

It is another object of the present invention to provide an efficient method for selectively removing copper from a wastewater stream.

It is yet another object of the present invention to provide methods using new materials useful in removing copper from a wastewater stream containing solids and oxidizing agents.

A still further object of the present invention is to provide an apparatus operative to efficiently remove copper from a CMP wastewater stream.

Yet another object of the present invention is to provide methods and apparatus for treating and processing a wastewater stream from which copper has been removed.

A further object of the present invention is to provide methods and apparatus for purifying and recycling water in the wastewater stream for reuse at a CMP tool.

According to the present invention, then, a method is provided for selectively removing metal ions of interest, such as copper ions, from a solution. The method comprises contacting a solution containing solid particles, an oxidizing agent and a first concentration of the metal ions with an ion-exchange resin that is resistant to damage by the oxidizing agent; such as a crosslinked poly-4-vinylpyridine resin, and Reillex 402 and Reillex 425 resins in particular. The resin is operative when in contact with the solution to exchange selected ones of the metal ions in the solution for selected preferred ions thereby to produce a treated solution having a second concentration of the metal ions that is lower than the first concentration. It is contemplated that the solution contains solid particles having a size distribution of from 0.02 micron to 0.10 micron, such as a solution that is the wastewater from a chemical mechanical polishing process. The ion-exchange resin may comprise a plurality of ion-exchange resin beads contained in a resin vessel thereby to define a resin bed, and the step of contacting may be accomplished by passing the solution in an up-flow direction through the resin vessel thereby to expand the resin bed. Such expansion may be from 10% to 60%.

The ion-exchange resin may be contacted with a regenerant solution, such as an acid or base solution, operative to exchange ions therein for the metal ions of interest contained in the ion-exchange resin, thereby to form a regenerant waste solution containing a salt of the metal ions of interest. The regenerant waste solution may be passed to an electrowinning cell that is operative to reduce the metal ions to their corresponding elementary metal. The ion-exchange resin may also be contacted with a first rinse solution, such as de-ionized water, thereby to form a second rinse solution, which may be passed to a regenerant source vessel to which a regenerant concentrate may be added thereby to form the regenerant solution in the regenerant source vessel.

The treated solution may be further processed, such as by adjusting the pH and oxidation-reduction potential of the treated solution, filtering by reverse osmosis, passing the solution through an electro-deionization system, and/or passing the solution through a UV/vacuum degasification system.

The present invention also relates to an apparatus for selectively removing metal ions of interest from a solution containing an oxidizing agent and a first concentration of the metal ions. The apparatus comprises an inlet adapted to receive the solution from a solution source, a resin vessel in fluid communication with the inlet and adapted to receive the solution therefrom, an ion-exchange resin disposed in the resin vessel, a first outlet in fluid communication with the resin vessel and adapted to receive a treated solution therefrom, a regenerant source in fluid communication with the resin vessel and operative to selectively provide thereto a regenerant solution, a second outlet in fluid communication with the resin vessel and adapted to receive a regenerant waste solution therefrom, and a valve system comprising a plurality of valves associated with a plurality of fluid pathways interconnecting selected ones of the inlet, the resin vessel, the regenerant source and the first and second outlets. The second outlet may be adapted to be placed in fluid communication with an electrowinning cell and to provide the regenerant waste solution thereto. The apparatus may include a rinse source in fluid communication with the resin vessel and operative to provide a rinse solution thereto. The apparatus may further include various processing devices, including a pH monitor, an oxidation-reduction potential monitor, a reverse-osmosis device, a UV/vacuum degasification unit, and an electro-deionization unit. The present invention contemplates apparatus comprising a plurality of resin vessels and ion-exchange resins respectively disposed therein, wherein various valve states permit fluid flow along selected fluid pathways.

The present invention further contemplates a system for removing metal ions of interest from a solution containing solid particles, an oxidizing agent and a first concentration of the metal ions. The system comprises a solution source, such as a CMP tool, operative to provide the solution containing the solid particles, the oxidizing agent and the first concentration of the metal ions, an ion-exchange apparatus, and a metal recovery apparatus, such as an electrowinning cell. The system may further include a waste processing apparatus that includes at least one device selected from the group consisting of a reverse-osmosis device, a UV/vacuum degasification device and an electro-deionization device, and/or which is operative to adjust a pH and oxidation-reduction potential of the treated solution to target values.

These and other objects of the present invention will become more readily appreciated and understood from a consideration of the following detailed description of the exemplary embodiment of the present invention when taken together with the accompanying drawings, in which:

BRIEF DESCRIPTION OF THE DRAWINGS

FIG. 1b is a diagrammatic view of optional regeneration and rinse/refill steps of the method of FIG. 1a;

DETAILED DESCRIPTION OF THE EXEMPLARY EMBODIMENTS

The present invention is directed to a method and apparatus incorporating a specialty ion-exchange resin for removal of metals from a stream of rinsewater generated by industrial manufacturing processes, such as copper CMP processes used in semiconductor manufacturing. The present invention is especially advantageous in the ability to selectively remove copper without removing oxidizers or solids present in the rinsewater stream. Additionally, the high degree of selectivity to transition and heavy metals allows the removal of copper without removing aluminum or other components of the solution, which would otherwise result in a decrease in capacity of the resin. It should be understood that, while the present invention is particularly discussed with respect to the removal of copper ions from a solution, the present application contemplates applications involving the removal from solution of various transition or heavy metals.

Figure 1A:
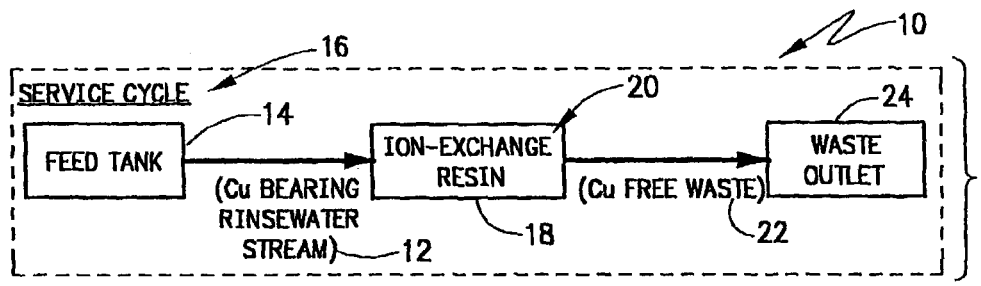
FIG. 1a is a diagrammatic view of the method according to the present invention.

As shown in FIG. 1a, then, the present invention is directed to a method 10 for removing metal such as copper from a selected environment, such as a copper bearing rinsewater stream 12. The method includes a service cycle 16, which includes providing a copper bearing rinsewater stream 12 from a source such as a feed tank 14 or other source operative to provide copper bearing rinsewater stream 12. The copper bearing rinsewater stream 12 is then contacted with an ion-exchange resin 20 which may be disposed in a resin vessel 18. The copper bearing rinsewater stream 12 that contacts the ion-exchange resin 20 undergoes ion-exchange such that copper ions are captured by ion-exchange resin 20. A treated solution, or copper free waste, 22 resulting from the ion-exchange of copper bearing rinsewater stream 12 with ion-exchange resin 20 may then be sent to a waste outlet 24 for disposal or further processing. It should be appreciated that while treated solution 22 is generally discussed herein as a "copper free waste", treated solution 22 generally includes any solution having a lower concentration of the respective metal ions of interest, such as copper ions, than the concentration thereof in the original metal bearing rinsewater stream solution 12 as a result of the ion-exchange of the present invention.

The preferred ion-exchange resin of the present invention is selected from a family of crosslinked poly-4-vinylpyridine resins and derivatives thereof, such as those manufactured by Reilly Industries, Inc., 1500 South Tibbs Avenue, Indianapolis, Ind. Exemplary ion-exchange resins are manufactured under the tradenames Reillex™402 and 425. The vinylpyridine structure of these resins makes them extremely resistant to attack by oxidizing agents, as compared for example to conventional resins that are crosslinked by divinylbenzene. Additionally, the crosslinked poly-4-vinylpyridine resins and derivatives thereof are very selective to transition and heavy metals. This provides an added advantage when aluminum or oxides of aluminum are present in the rinsewater steam, given that it becomes possible to remove copper as desired without unnecessarily removing aluminum. Conventional resins would remove both copper and aluminum, resulting in loss of capacity of the resin for copper removal. Other ion-exchange resins contemplated for use with the present invention are discussed, for example, in U.S. Pat. Nos. 5,281,631, 5,449,462, and 5,539,003 to Horwitz et al., which relate to phosphonic acid based ion exchange resins.

Figure 1B:
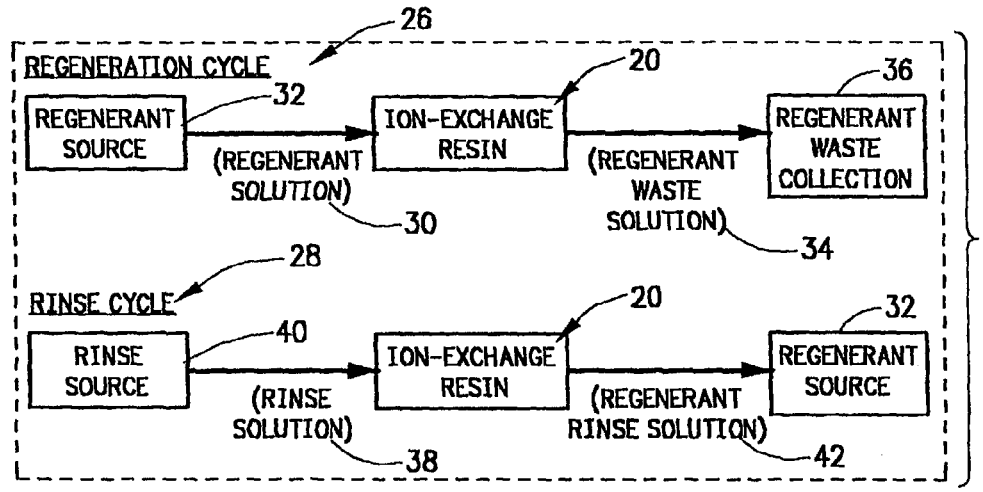

As shown in FIG. 1b, the method according to the present invention optionally includes a regeneration cycle 26 and a rinse cycle 28. The step of regenerating includes contacting a regenerant solution 30, such as an acid solution, provided by regenerant source 32 with the ion-exchange resin 20. Regenerant solution 30 is selected according to the requirements of ion-exchange resin 20, to the extent understood by the ordinarily skilled artisan. Ion-exchange resin 20 is regenerated by contact with regenerant solution 30, and regenerant waste solution 34 containing copper ions is produced thereby. The copper bearing regenerant waste solution 34 is sent to regenerant waste collection 36 for disposal or further processing, such as by an electrowinning cell. An exemplary electrowinning cell apparatus for use with the present invention is disclosed in application Ser. No. 09/322,745, filed May 28, 1999, entitled Electrowinning Cell Incorporating Metal Ion Filtration Apparatus.

The rinse cycle 28 includes contacting ion-exchange resin 20 with a rinse solution 38, such as de-ionized water, provided by rinse source 40. Any regenerant solution 30 remaining in resin vessel 18 is rinsed therefrom by rinse solution 38 to form regenerant rinse solution 42. Regenerant rinse solution 42 may then be sent to regenerant source 32 where it may be recycled for use in forming regenerant solution 30, such as by adding concentrated acid thereto.

Figure 1C:
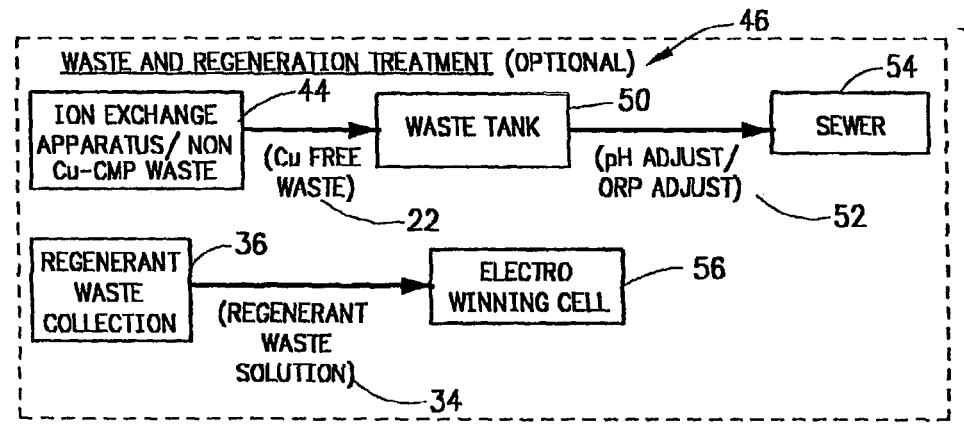
FIG. 1c is a diagrammatic view of optional waste and regenerant treatment steps of the method according to the present invention.
Figure 1D:
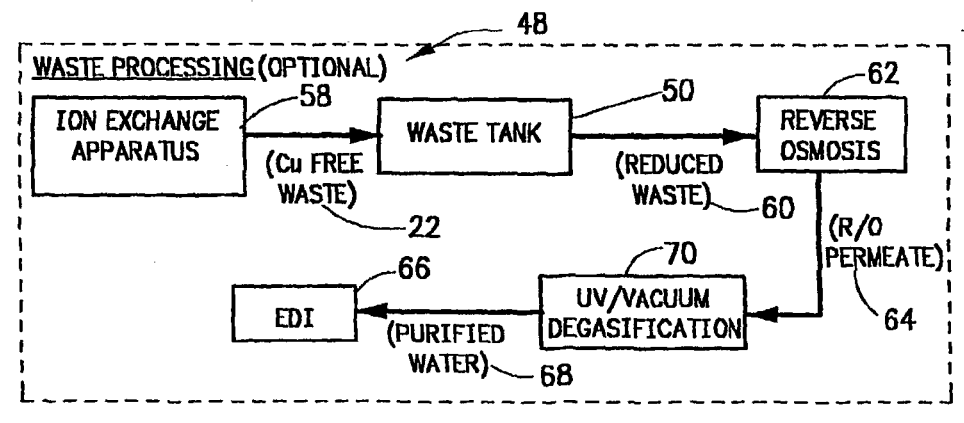
FIG. 1d is a diagrammatic view of optional alternative waste processing steps of the method according to the present invention.

As shown in FIGS. 1c and 1d, the method of the present invention may optionally include a waste and regenerant treatment step 46 or alternatively a waste processing step 48. With reference to FIG. 1c, copper free waste 22 produced by the method of the present invention, and/or non copper CMP waste such as from other industrial processes 44, is sent to a waste tank 50. There it undergoes pH adjust and/or oxidation-reduction potential (ORP) adjust 52. The step of adjusting pH may occur by monitoring pH such as with a pH monitor, and adding acid or base as desired to reach a target pH. The step of adjusting ORP may occur by monitoring ORP such as with an ORP monitor to detect an oxidation-reduction potential, and adding for example NaHSO$_3$ to adjust ORP as desired. The resulting solution may then be disposed of, such as by sending to sewer 54. Additionally, regenerant waste solution 34 from regenerant waste collection point 36 may be further processed such as by electrowinning cell 56.

With reference to FIG. 1d, an alternative waste processing step 48 includes sending copper free waste 22 from an ion-exchange apparatus 58, such as provided in the present invention, to a waste tank 50. A reducing agent may be added to waste tank 50, such as by monitoring ORP with an ORP monitor and signaling a pump to pump a reducing agent into waste tank 50 when an oxidation-reduction potential is detected. Reduced waste 60 may then undergo reverse osmosis 62, which is preferably a double pass R/O system especially configured to be suitable for high solids in the feed stream, such as by utilizing polymeric spiral wound membranes with wide spacers, or ceramic membranes. The R/O permeate 64 may then be sent through a UV/vacuum degasification process 70 for trace organics removal, which may comprise passing R/O permeate 64 through an organic destruct UV lamp and then a vacuum degasser. The resulting purified water 68 preferably further undergoes electrodeionization (EDI) 66.

Figure 2A:
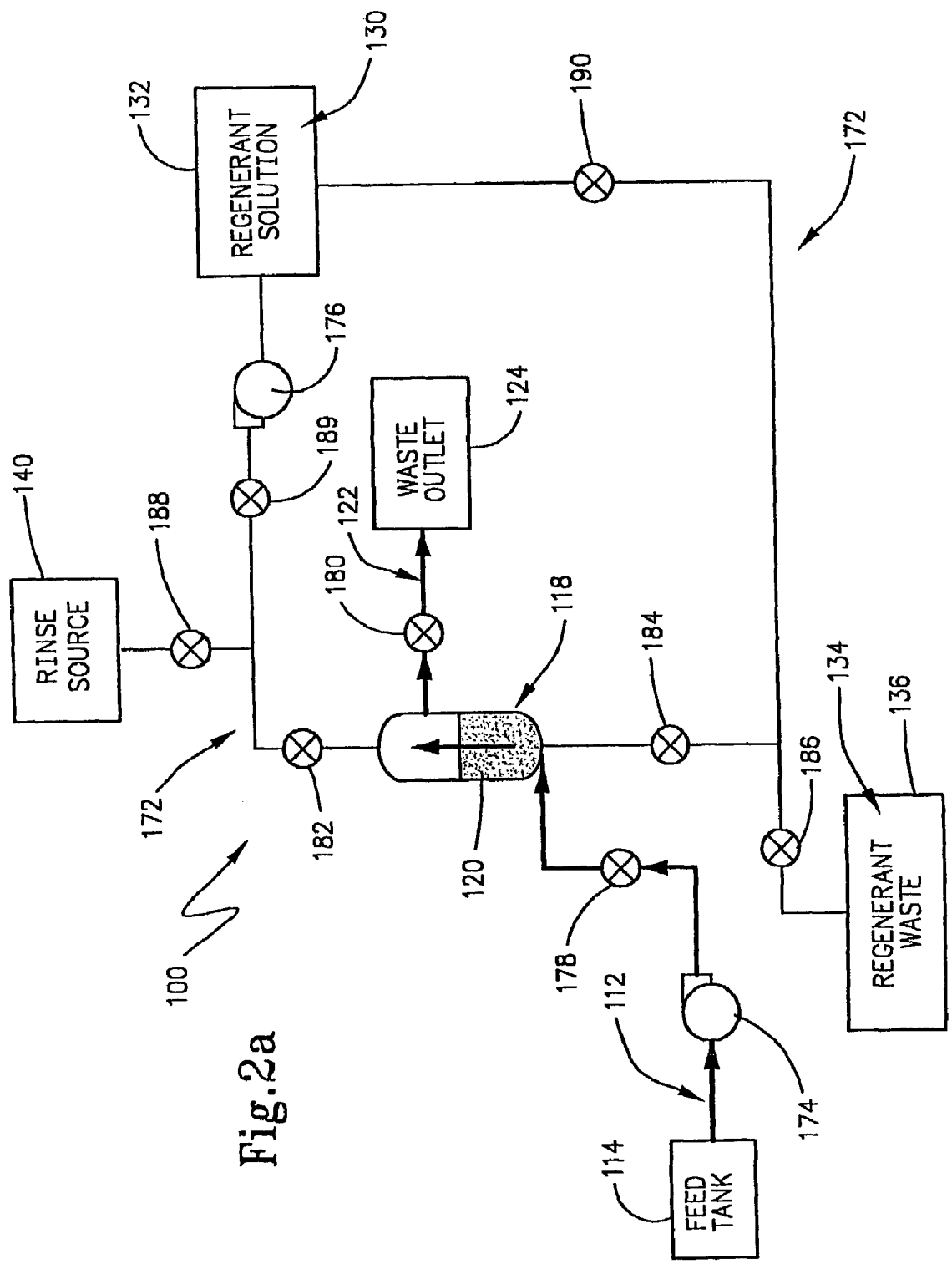
FIG. 2a is a diagrammatic view of a basic embodiment of an apparatus according to the present invention, showing a service cycle thereof.
Figure 2B:
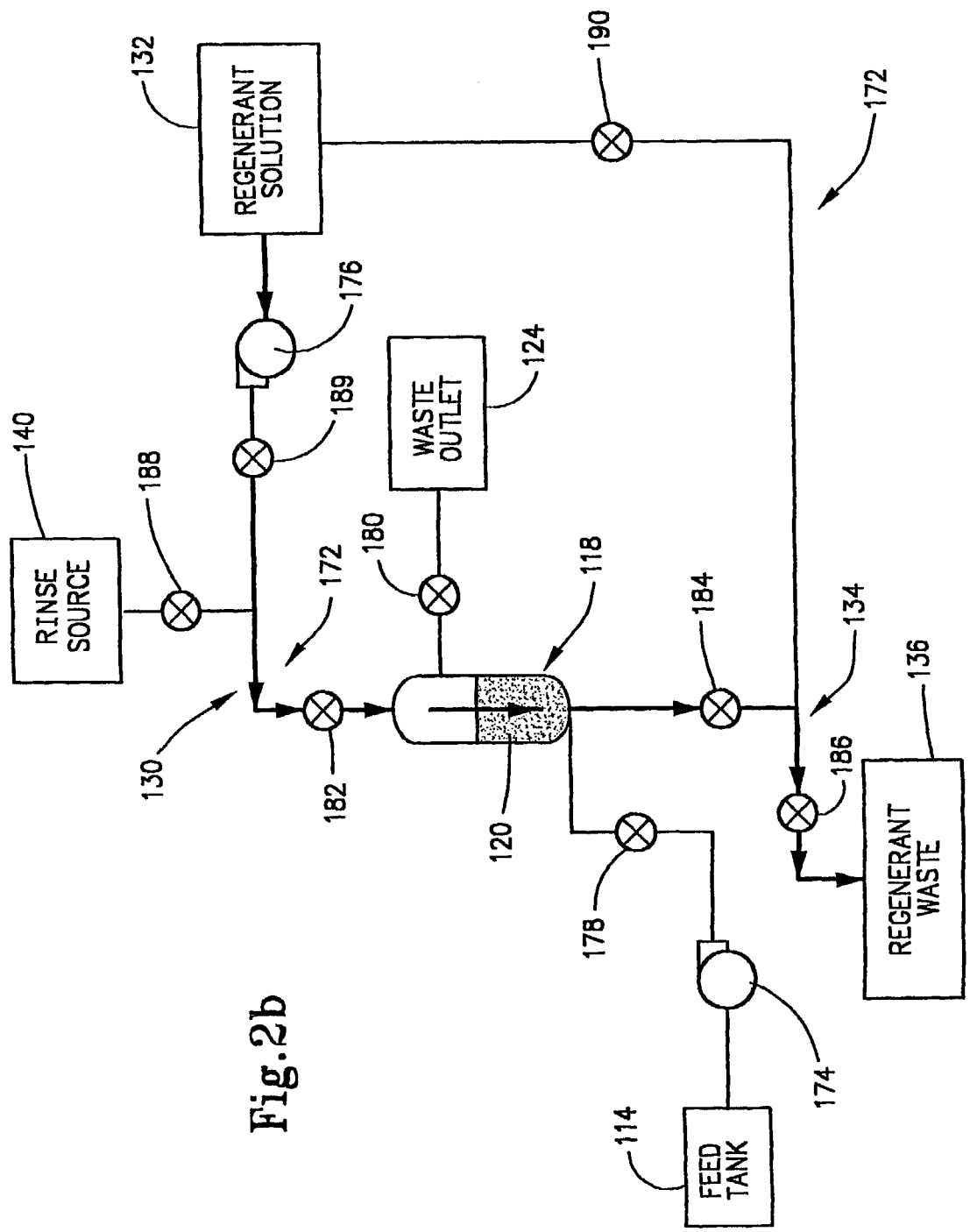
FIG. 2b is a diagrammatic view of the apparatus according to FIG. 2a, showing a regeneration cycle thereof.
Figure 2C:
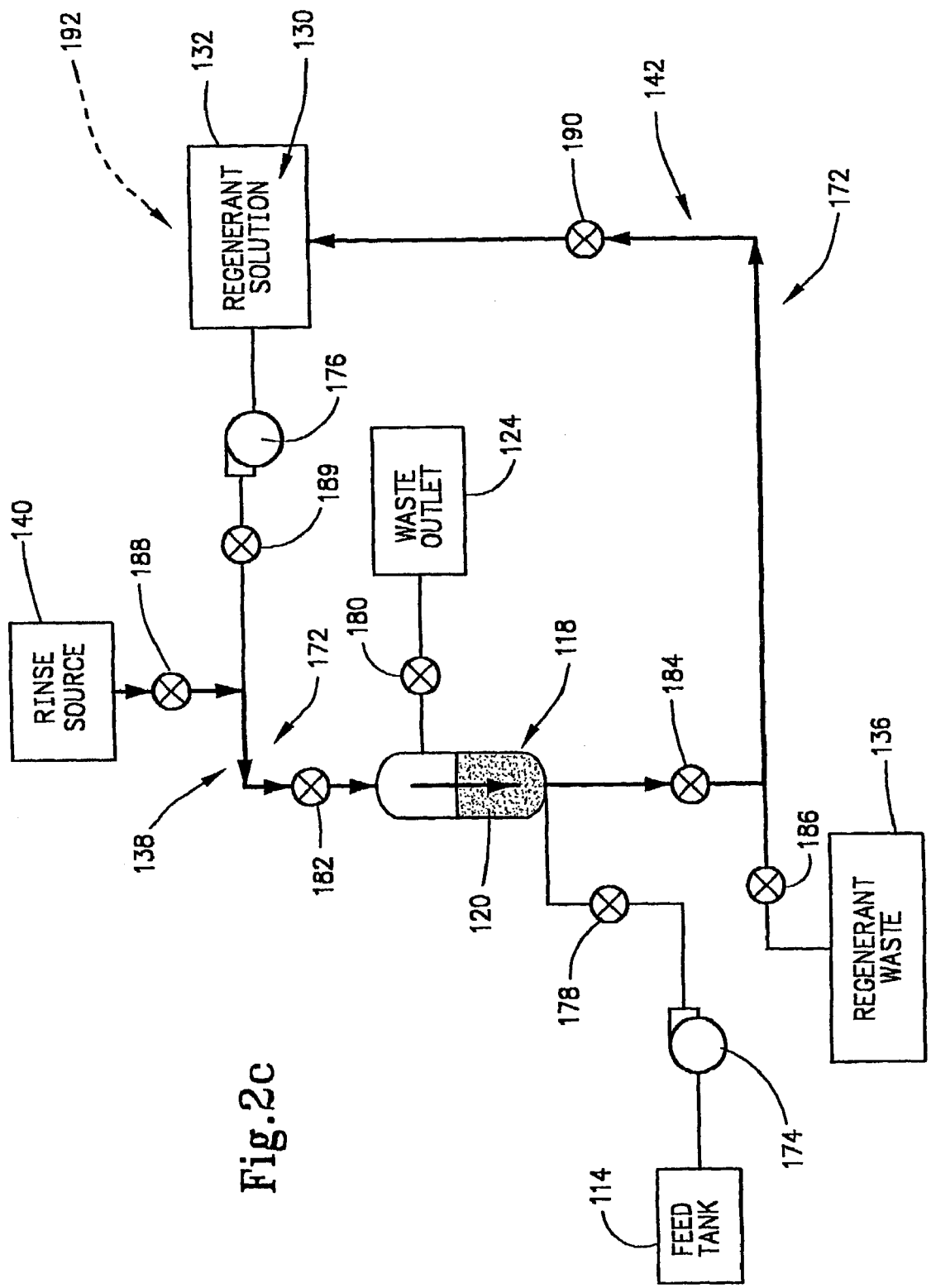
FIG. 2c is a diagrammatic view of the apparatus according to FIGS. 2a and 2b, showing a rinse/refill cycle thereof.

A general embodiment of the apparatus 100 according to the present invention is shown in FIGS. 2a–2c. Here, apparatus 100 includes feed tank 114 operative to provide a Cu bearing rinsewater stream 112, resin vessel 118 having ion-exchange resin 120 disposed therein, regenerant source vessel 132 having regenerant solution 130 disposed therein, rinse source 140 operative to provide a rinse solution, waste outlet 124, here shown as a container adapted to receive Cu free waste 122, and regenerant waste collection 136 operative to receive regenerant waste 134. Feed tank 114, resin vessel 118, regenerant source vessel 132, rinse source 140, waste outlet 124 and regenerant waste collection 136 are fluidly connected by conduit 172, which is adapted to receive a fluid stream. Pumps 174 and 176 are disposed in conduit 172, and each have an on state wherein they are operative to pump fluid through conduit 172 and an off state wherein they do not pump fluid. Valves 178, 180, 182, 184, 186, 188, 189 and 190 are disposed in conduit 172 and are operative to move between a closed state preventing fluid flow therethrough and an open state allowing fluid flow therethrough.

FIG. 2a shows the service cycle for apparatus 100. Here, Cu bearing rinsewater stream 112 is pumped from feed tank 114 by pump 174 in preferably an upflow direction through resin vessel 118. Ion exchange resin 120 accordingly expands, or fluidizes, as a result of the upflow direction of travel of stream 112. Preferably, the bed of ion exchange resin 120 expands approximately 25%, although a range of expansion of 10%–60% is contemplated. Valves 178 and 180 are open, while the remaining valves are closed. Cu bearing rinsewater stream 112 flows through resin vessel 118 where it undergoes ion-exchange with ion exchange resin 120, such that copper ions are captured by ion exchange resin 120. Copper free waste 122, which may contain little or no copper ions, is then passed from resin vessel 118 to waste outlet 124 where it may be treated or processed, if desired, and either disposed of or recycled in the manufacturing process.

When ion-exchange resin 120 is at full capacity of copper ions, a regeneration cycle begins as shown in FIG. 2b. Here, valves 178 and 180 are closed and pump 174 is turned off. Valves 182, 184, 186 and 189 are opened and pump 176 is turned on. Regenerant solution 130, preferably an acid solution such as sulfuric acid or alternatively a base solution such as ammonium hydroxide, is pumped from regenerant source vessel 132 and through resin vessel 118, where it undergoes ion-exchange with ion-exchange resin 120, thereby to produce regenerant waste 134 containing copper salt. The concentration, as well as rate of flow through resin vessel 118, of regenerant solution 130 is preferably adjusted according to the concentration of regenerant waste 134 that is desired.

Once ion-exchange resin 120 has been regenerated, a rinse cycle begins, as shown in FIG. 2c. Here, valves 186 and 189 are closed and valves 188 and 190 are opened, while pump 176 is turned off. Rinse solution 138, provided by rinse source 140, passes through resin vessel 118 to rinse any remaining regenerant solution 130 therefrom. Regenerant rinse solution 142 then flows to regenerant source vessel 132, where regenerant rinse solution 142 may be recycled to form a new regenerant solution 130, such as by adding concentrated regenerant 192, preferably concentrated acid, to regenerant source vessel 132 until a desired regeneration concentration of regenerant solution 130 is achieved. To the extent understood by the ordinarily skilled artisan, a concentration monitor/control or pH monitor/control may be used to automatically adjust the concentration of regenerant to regeneration levels by pumping concentrated solution to regenerant source vessel 132 as desired.

Once the rinse/refill cycle has completed, valves 182, 184, 188 and 190 are closed and valves 178 and 180 are opened, and pump 174 is turned on, thereby to begin the service cycle again.

The various on/off and open/closed states of valves and pumps during the operation cycles for apparatus 100 is summarized in Table 1 below:

TABLE 1

|  | Service Cycle | Regeneration Cycle | Rinse/Refill Cycle |
| --- | --- | --- | --- |
| Pump 174 | ON | OFF | OFF |
| Pump 176 | OFF | ON | OFF |
| Valve 178 | OPEN | CLOSED | CLOSED |
| Valve 180 | OPEN | CLOSED | CLOSED |
| Valve 182 | CLOSED | OPEN | OPEN |
| Valve 184 | CLOSED | OPEN | OPEN |
| Valve 186 | CLOSED | OPEN | CLOSED |
| Valve 188 | CLOSED | CLOSED | OPEN |
| Valve 189 | CLOSED | OPEN | CLOSED |
| Valve 190 | CLOSED | CLOSED | OPEN |

A more preferred embodiment of the present invention is shown in FIGS. 3a–3d. Here, apparatus 200 includes a dual resin setup, wherein two ion-exchange resins are utilized such that one of the ion-exchange resins can be in the service cycle while the other of the ion-exchange resins undergoes the regeneration and rinse/refill cycles. Thus, it becomes unnecessary to interrupt the copper removal process, because a service cycle can be continuously performed by the apparatus.

Apparatus 200 includes a feed tank 214, which is operative to supply copper bearing rinsewater stream 212 to a conduit 272 which interconnects various components of the apparatus 200. First resin vessel 218 and second resin vessel 219 are provided in fluid communication with conduit 272, and each resin vessel contains ion-exchange resin 220 and 221, respectively. Rinse source 240 is further in fluid communication with conduit 272, and is operative to provide de-ionized water 238. Regenerant source vessel 232 is operative to provide acid 230, as appropriate for regeneration of ion exchange resins 220 and 221. Waste outlet 224 is operative to receive copper free waste 222 resulting from ion-exchange of copper bearing rinsewater stream 212 with either of ion-exchange resins 220 or 221. Regenerant waste collection 236 is operative to receive regenerant waste solution 234, having copper salt present therein resulting from the regeneration of either of ion-exchange resins 220 or 221.

Pumps 274 and 276 are disposed in conduit 272 and are operative in an on state to pump fluid through conduit 272. Valves 278 through 286, and 288 through 290 are disposed in conduit 272 and are operative to move between a closed state preventing fluid flow therethrough and an open state allowing fluid flow therethrough.

Figure 3A:
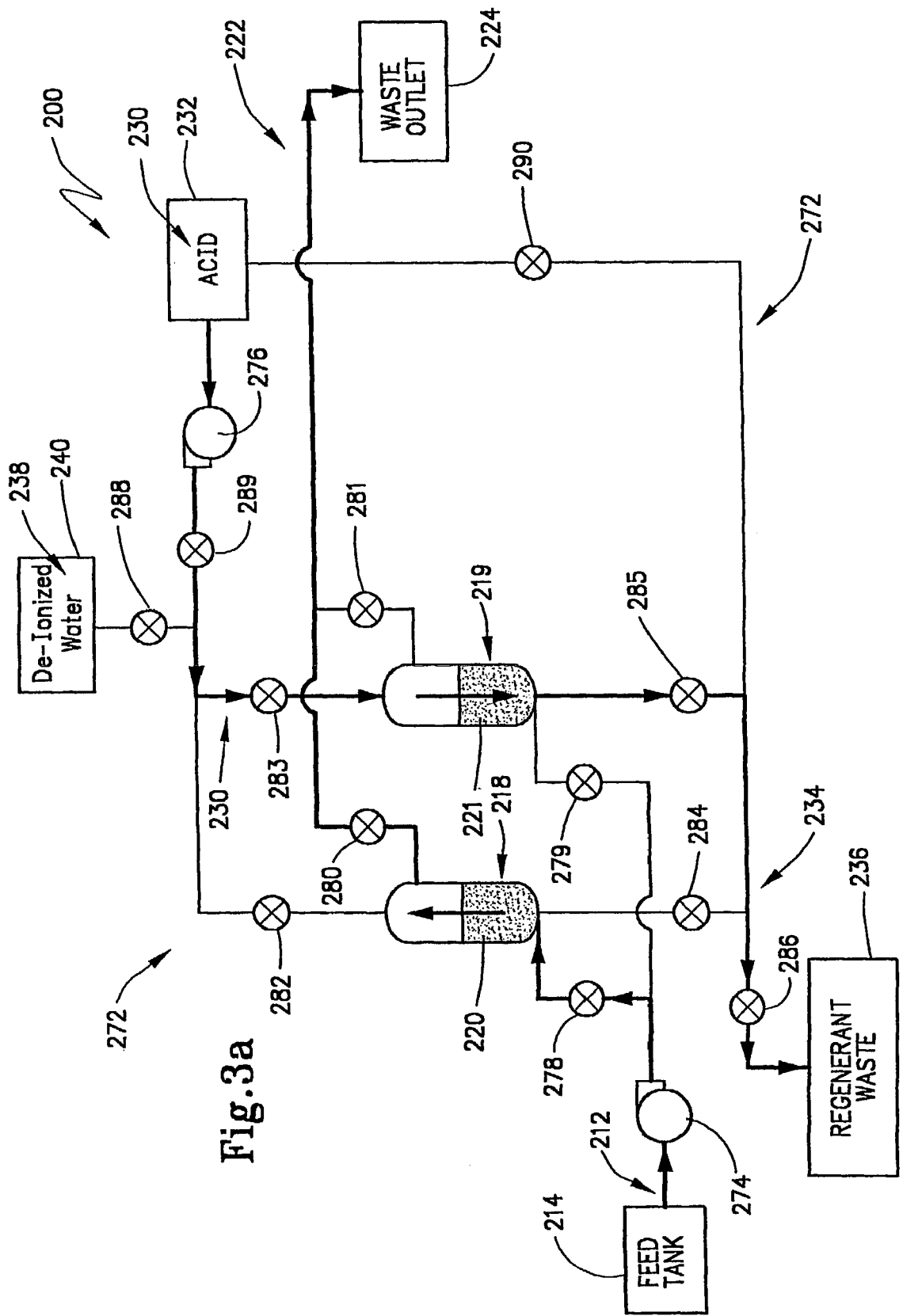
FIG. 3a is a diagrammatic view of a more preferred embodiment of the present invention, showing a service cycle of a first resin and a regeneration cycle of a second resin.
Figure 3B:
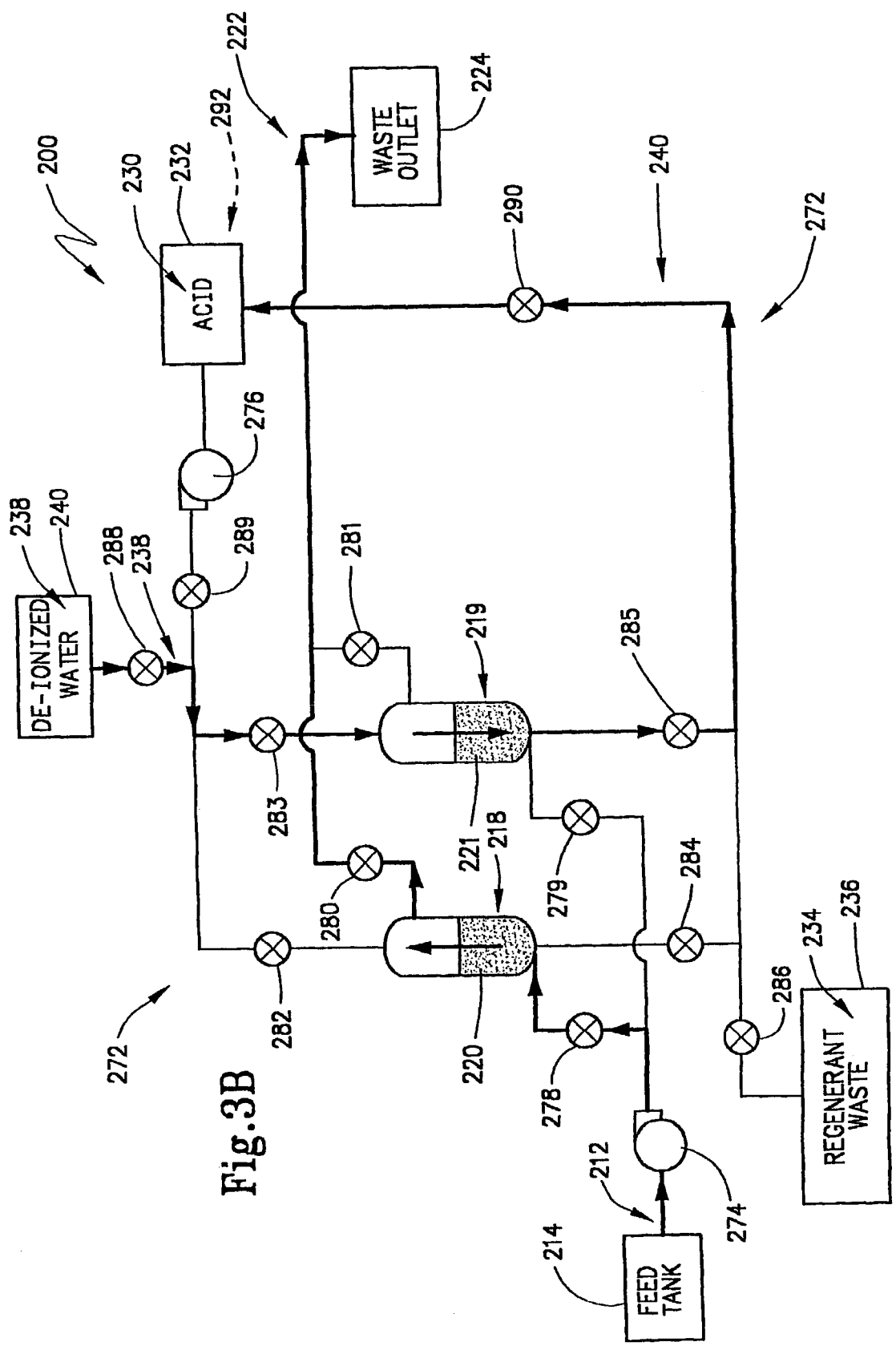
FIG. 3b is a diagrammatic view of the apparatus according to FIG. 3a, showing a service cycle of the first resin and a rinse/refill cycle of the second resin.

As shown in FIGS. 3a and 3b, first resin vessel 218 can undergo a service cycle while second resin vessel 219 undergoes both a regeneration cycle and a rinse/refill cycle. In particular, as shown in FIG. 3a, pumps 274 and 276 are turned on, valves 278, 280, 283, 285, 286 and 289 are opened and valves 279, 281; 282, 284, 288 and 290 are closed thereby to work a service cycle in first resin vessel 218 and a regeneration cycle in second resin vessel 219. With respect to the service cycle of first resin vessel 218, copper bearing waste 212 is passed in a preferably upflow direction through resin vessel 218, where it undergoes ion-exchange with ion-exchange resin 220. Copper free waste 222 resulting therefrom is sent to waste outlet 224. Concurrently, acid 230 from regenerant source vessel 232 is pumped by pump 276 through resin vessel 219 thereby to regenerate ion-exchange resin 221 to form copper salt bearing regenerant waste 234 which is sent to regenerant waste collection 236.

As shown in FIG. 3b, once ion-exchange resin 221 is regenerated, a rinse/refill cycle begins on second resin vessel 219, while the service cycle continues on first resin vessel 218. Here, pump 276 is turned off, valves 288 and 290 open and valves 286 and 289 close. De-ionized water 238 from rinse source 240 is passed through second resin vessel 219 thereby to rinse away any excess acid and to form regenerant rinse solution 240 which is passed to regenerant source vessel 232 for reuse in forming the acid regenerant solution 230. Concentrated acid 292 may be added to regenerant source vessel 232 to adjust the concentration of acid regenerant solution 230 as desired.

Once the rinse/refill cycle has completed, valves 283, 285, 288 and 290 are closed and the service cycle continues on first resin vessel 218 until ion-exchange resin 220 is exhausted. Exhaustion of ion-exchange resin 220 may be determined, for example, by measuring the concentration and flow volume of copper bearing rinsewater stream 212 and comparing with the known capacity of ion-exchange resin 220.

Figure 3C:
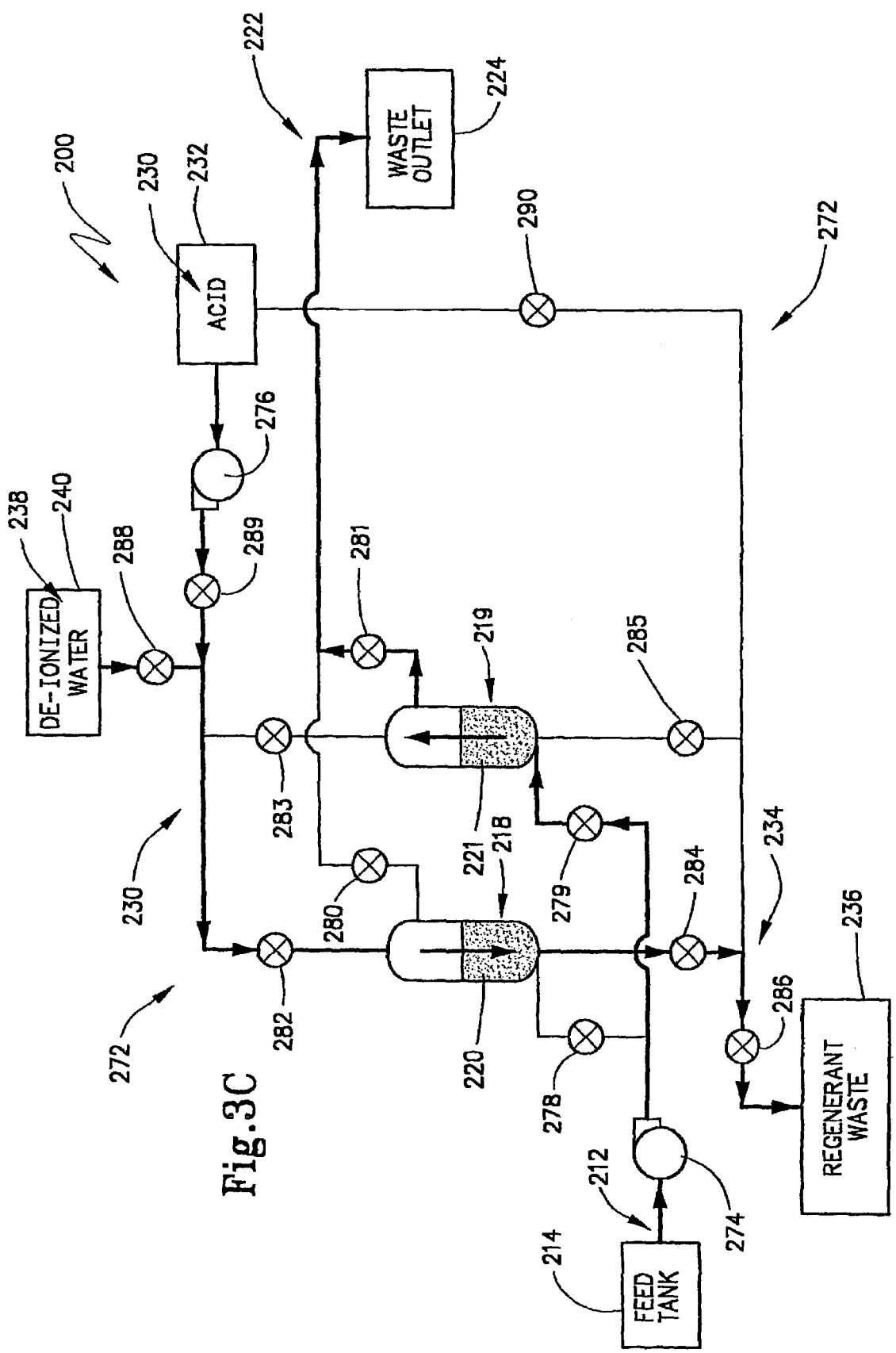
FIG. 3c is a diagrammatic view of the apparatus according to FIGS. 3a and 3b, showing a service cycle of the second resin and a regeneration cycle of the first resin.
Figure 3D:
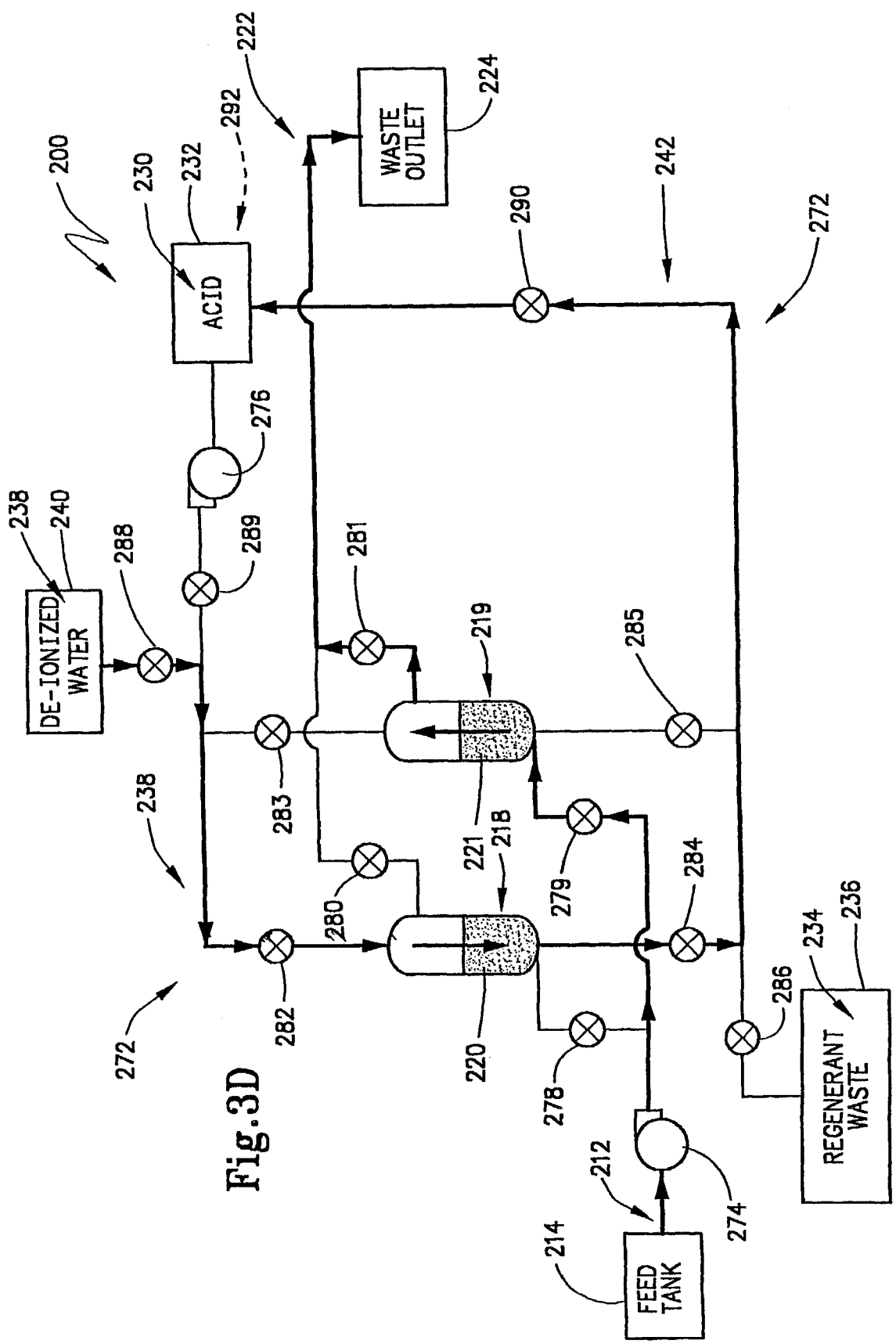
FIG. 3d is a diagrammatic view of the apparatus according to FIGS. 3a–3c, showing a service cycle of the second resin and a rinse/refill cycle of the first resin.

At this time, as shown in FIGS. 3c and 3d, second resin vessel 219 undergoes a service cycle while first resin vessel 218 undergoes regeneration and rinse/refill cycles. In particular, as shown in FIG. 3c, pump 276 is turned on, valves 279, 281, 282, 284, 286 and 289 are opened and valves 278, 280, 283, 285, 288 and 290 are closed. With respect to the service cycle through second resin vessel 219, copper bearing rinsewater stream 212 from feed tank 214 is sent through second resin vessel 219 thereby undergoing ion-exchange with ion-exchange resin 221. Copper free waste 222 resulting therefrom is sent to waste outlet 224. First resin vessel 218 undergoes regeneration as acid 230 is pumped by pump 276 from regenerant source vessel 232 through first resin vessel 218 thereby undergoing ion-exchange with ion-exchange resin 220 to form copper salt bearing regenerant waste 234 which is sent to regenerant waste collection 236.

As shown in FIG. 3d, once ion-exchange resin 220 is regenerated, pump 276 is turned off, valves 286 and 289 are closed and valves 288 and 290 are opened. Second resin vessel 219 continues undergoing a service cycle. De-ionized water 238 from rinse source 240 passes through first resin vessel 218 thereby to rinse any excess acid therefrom. The regenerant rinse solution 242 is then passed to regenerant source vessel 232 where it is recycled for use in acid regenerant solution 230, the concentration of which may be adjusted by addition of concentrated acid regenerant 292.

Once rinse/refill cycle has completed, valves 282, 284, 288 and 290 are closed and the service cycle continues on second resin vessel 219 until ion-exchange resin 221 is exhausted. At this point, a service cycle on first resin vessel 218 and a regeneration cycle on second resin vessel 219 begins again as shown in FIG. 3a.

The various on/off and open/closed states of valves and pumps during the operation cycles for apparatus 200 is summarized in Table 2 below:

TABLE 2

|  | First resin service cycle/ second resin regen. cycle | First resin service cycle/ second resin rinse cycle | Second resin service cycle/first resin regen. cycle | Second resin service cycle/first resin rinse cycle |
| --- | --- | --- | --- | --- |
| Pump 274 | ON | ON | ON | ON |
| Pump 276 | ON | OFF | ON | OFF |
| Valve 278 | OPEN | OPEN | CLOSED | CLOSED |
| Valve 279 | CLOSED | CLOSED | OPEN | OPEN |
| Valve 280 | OPEN | OPEN | CLOSED | CLOSED |
| Valve 281 | CLOSED | CLOSED | OPEN | OPEN |
| Valve 282 | CLOSED | CLOSED | OPEN | OPEN |
| Valve 283 | OPEN | OPEN | CLOSED | CLOSED |
| Valve 284 | CLOSED | CLOSED | OPEN | OPEN |
| Valve 285 | OPEN | OPEN | CLOSED | CLOSED |
| Valve 286 | OPEN | CLOSED | OPEN | CLOSED |
| Valve 288 | CLOSED | OPEN | CLOSED | OPEN |
| Valve 289 | OPEN | CLOSED | OPEN | CLOSED |
| Valve 290 | CLOSED | OPEN | CLOSED | OPEN |

Figure 4:
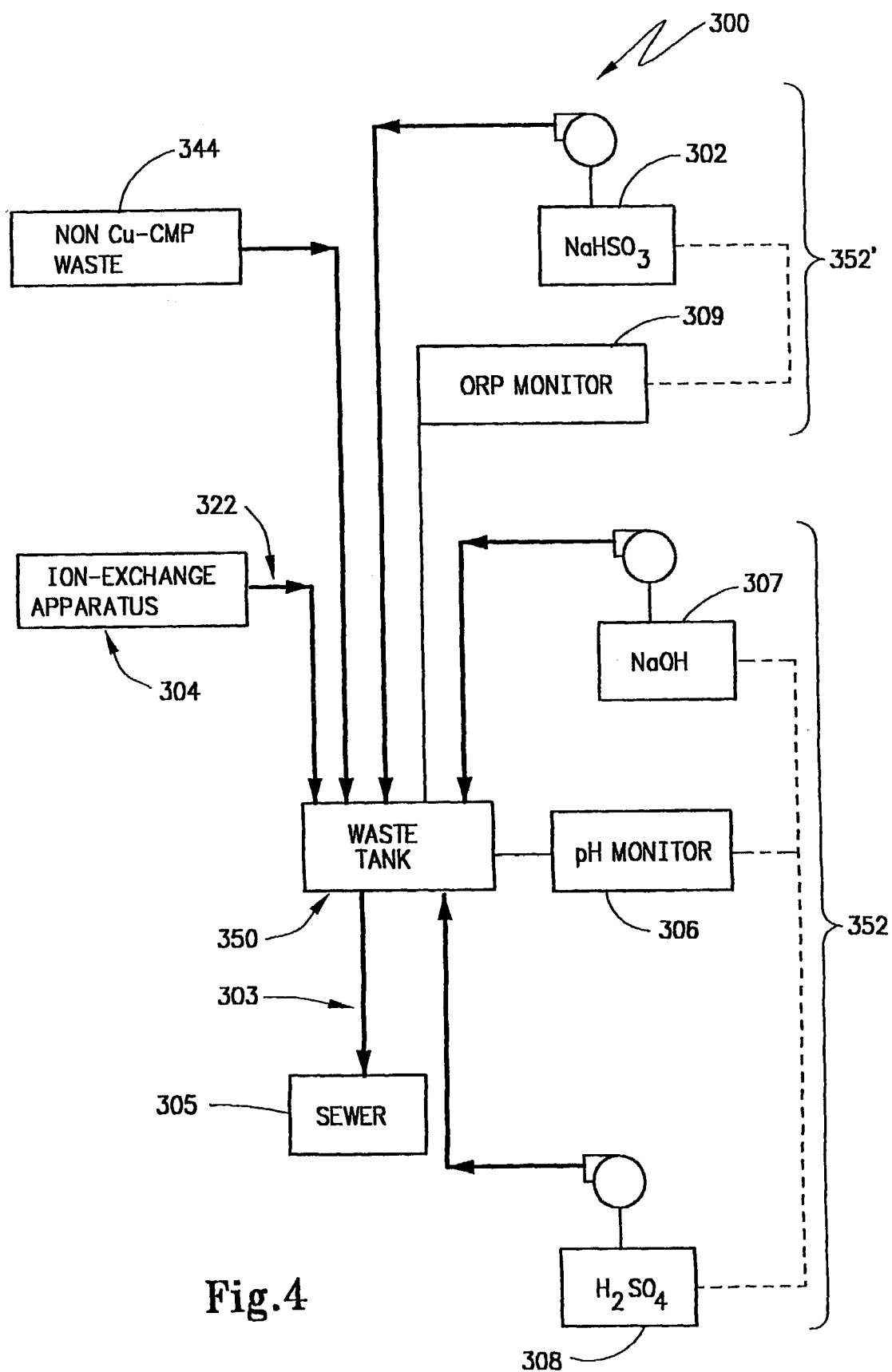
FIG. 4 is a diagrammatic view of a waste treatment or processing apparatus for use in treating the copper free waste produced by the ion-exchange apparatus of the present invention.
Figure 5:
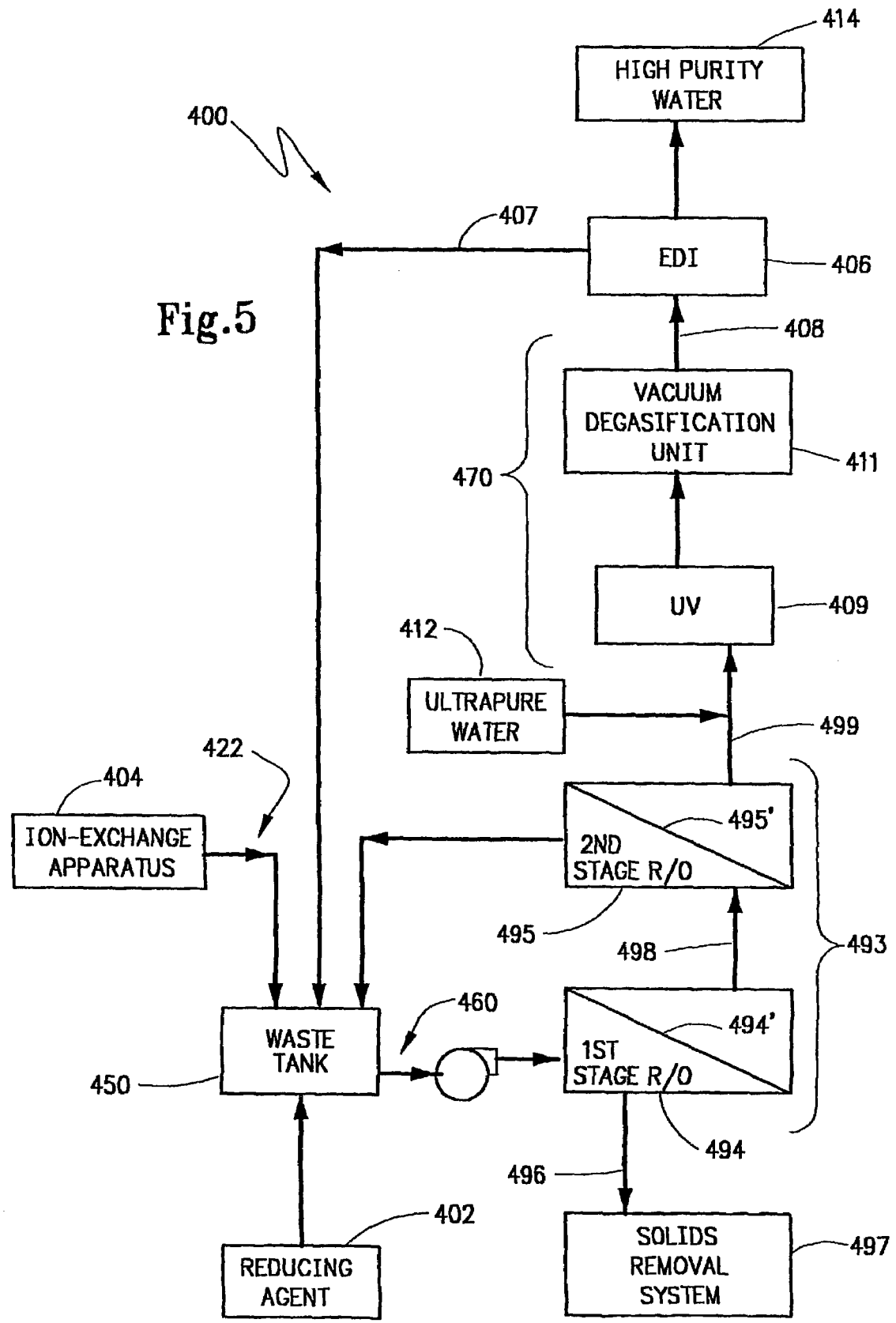
FIG. 5 is a diagrammatic view of an alternative embodiment of a waste treatment or processing apparatus for use in treating the copper free waste produced by the ion-exchange apparatus of the present invention.

As shown in FIGS. 4 and 5, the present invention also includes the treatment and processing of copper free waste resulting from the ion-exchange of a copper bearing rinsewater stream according to the present invention. The treatment and processing as shown in FIGS. 4 and 5 may be an add-on to the ion-exchange apparatus of the present invention, or may separately treat copper free waste from a single source, such as non Cu-CMP waste from the manufacturing process, or from a plurality of sources, such as numerous ion-exchange apparatus linked to CMP or other tools, in a manufacturing process.

As shown in FIG. 4, an exemplary copper free waste treatment or processing apparatus 300 according to the present invention includes a waste tank 350 in fluid communication with a copper free waste source, such as an ion-exchange apparatus 304 which may be similar or identical to the apparatus of FIGS. 2a–2c or 3a–3d. Here, copper free waste 322, resulting from the ion-exchange of a copper bearing rinsewater stream, is transferred from the waste source to a waste tank 350. It should be understood that waste tank 350 may be any type of fluid container, collection vessel or conduit. Additionally, other copper free waste to be disposed of, such as from non-copper CMP 344 or other sources, may be sent to waste tank 350 for treatment or processing. Since the copper free waste 322 and effluent from other sources may have low pH and oxidizers such as $H_2O_2$, it is desirable to adjust the pH and ORP of the copper free waste 322 in waste tank 350 so as to meet disposal requirements, allowing efficient disposal of the waste solution. Accordingly, the solution in waste tank 350 preferably undergoes pH adjustment 352 and/or ORP adjustment 352', as necessary.

In particular, a pH monitor 306 may be used to monitor the pH of copper free waste 322 in waste tank 350. pH monitor 306 may signal to pump either a base or acid solution into waste tank 350 as necessary to adjust the pH of copper free waste 322 to a target pH. Specifically, pH monitor 306 may signal to pump NaOH 307 into waste tank 350 when the pH of copper free waste 322 is below the target pH. Conversely, pH monitor 306 may signal to pump $H_2SO_4$ into waste tank 350 when the pH of copper free waste 322 is above the target pH. Similarly, ORP monitor 309 may signal to pump $NaHSO_3$ 302 into waste tank 350 when an oxidation-reduction potential is detected. Treated waste 303 may then be disposed of, such as by sending to sewer 305.

As shown in FIG. 5, an alternative waste treatment or processing apparatus 400 may be seen as an add-on to existing manufacturing tools, such as to one or more ion-exchange apparatus according to the present invention, as well as to non copper CMP tools and other sources of copper free waste. In particular, apparatus 400 allows the recycling of water from which copper has been removed, such as by the ion-exchange method and apparatus of the present invention. The recycled water can be reused at the CMP tool or in other manufacturing processes. It should be understood that apparatus 400 may be used to process rinse streams from a given tool as a "point of use" (POU) device, from several tools—such as five tools—as a "local" device, or from all tools as a "facilities" device when rinse streams are combined and treated in a central location. The use of apparatus 400 with the ion-exchange method and apparatus of the present invention provides an advantage in that solids removed and concentrated by apparatus 400 do not contain copper and therefore can be disposed of as non-hazardous waste. With respect to copper bearing regenerant waste resulting from the ion-exchange, it may be desirable to send the regenerant waste from several sources, including point-of-use and local systems, to a facilities electrowinning cell for copper recovery, since electrowinning cells can be labor intensive at times.

In the exemplary embodiment, apparatus 400 includes waste tank 450 in fluid communication with a rinse stream source, such as an ion-exchange apparatus 404 which may be similar or identical to the apparatus of FIGS. 2a–2c or 3a–3d. It should be understood that rinse streams from other sources, such as other manufacturing tools, may also be processed by apparatus 400. With respect to ion-exchange apparatus 404, copper free waste 422, resulting from the ion-exchange of a copper bearing rinsewater stream, is transferred from the waste source to the waste tank 450. Copper free waste 422 may be completely free of copper ions, although it should be understood that copper free waste 422 may contain a small concentration of copper ions. Waste tank 450 may be any type of fluid container, collection vessel or conduit.

A reducing agent 402 may be added to waste tank 450 to neutralize oxidizers present in copper free waste 422. To the extent understood by the ordinarily skilled artisan, an ORP monitor may be used to signal the addition of reducing agent 402 when an oxidation-reduction potential is detected. The reduced waste 460 then undergoes a reverse osmosis (R/O) process 493, which is preferably a double pass reverse osmosis system, thereby to remove organics and dissolved salts from the water. It should be understood, however, that both single and multi-stage R/O processes are contemplated by the present invention. Apparatus 400 preferably include a first stage R/O 494 and a second stage R/O 495, which includes R/O membranes 494' and 495' that have wide spacers to avoid plugging by the solids. Exemplary membranes are Desal™ proprietary membrane products manufactured by Osmonics, 760 Shadowridge Dr., Vista, Calif. 92083. Alternatively, the R/O stages may utilize other types of membranes adapted for use with high solids in the seed stream, such as ceramic membranes.

The reduced waste 460 is preferably first sent through first stage R/O 494. The first stage R/O reject, or retentate, 496, which contains copper free solids, may be sent to drain. If solids removal is required, however, such as by local ordinances, the R/O reject 496 may be sent to a "facilities" solids removal system 497, which may receive solid-bearing wastes from other systems as well. The first stage R/O permeate 498 is then preferably sent through the second stage R/O 495. The second stage R/O reject 498 is preferably returned to waste tank 450, and the second stage R/O permeate 499 is then preferably sent through an organic destruct UV lamp 409 and then a vacuum degasser 411 for trace organics removal. Any lost volume of water from the R/O reject can be made up by adding ultrapure water 412, such as from the fab de-ionized water line, to the second stage R/O permeate 499 prior to sending second stage R/O permeate 499 through organic destruct UV lamp 409.

After the UV/Vacuum degasification step 470, purified water 408 is preferably sent to electro-deonization (EDI) system 406, which exchanges unwanted saline ions by exchanging them for either hydrogen or hydroxyl ions. Exemplary EDI units for use with the present invention are manufactured by Electropure, in Laguna Hills, Calif. The EDI waste 407 is preferably returned to waste tank 450. The resulting high purity water 414 is preferably polished to 18.3 meg-ohm-cm resistivity water by EDI cell 406. High purity water 414 can then be recycled by returning it for reuse in manufacturing and other processes.

It should be understood that the present invention contemplates variations on the above-described apparatus, such as variations in the selection and placement of components. In particular, the present invention contemplates waste processing apparatus that include one or more of the components selected from the reducing agent 402, R/O process 493, EDI unit 406, ultrapure water 412, UV lamp 409, and vacuum degasification unit 411, in various combinations and orders.

Figure 6:
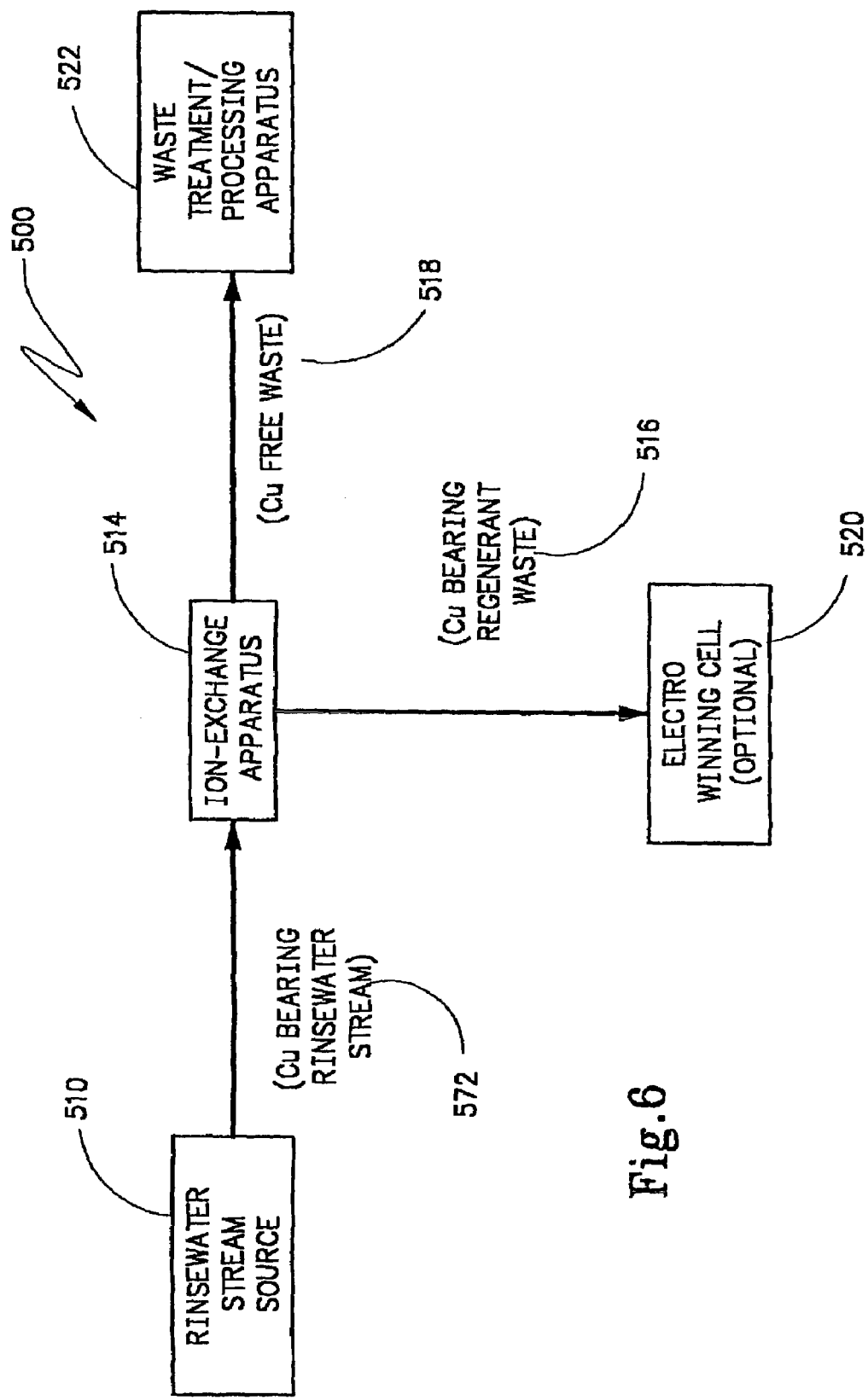
FIG. 6 is a diagrammatic view of a copper bearing waste treatment system according to the present invention.

As shown in FIG. 6, the present invention also contemplates a system for treating copper bearing waste. In particular, the exemplary system 500 includes a rinsewater stream source 510, such as a copper CMP tool, which is operative to provide copper bearing rinsewater stream 512 to an ion-exchange apparatus 514 according to the present invention. Ion-exchange apparatus 514 is operative to provide a copper bearing regenerant waste 516 and a copper free waste 518. Copper bearing regenerant waste 516 may be sent for copper recovery to an optional electrowinning cell 520, such as a "facilities" electrowinning cell or an electrowinning cell as disclosed in application Ser. No. 09/322, 745, filed May 28, 1999, entitled Electrowinning Cell Incorporating Metal Ion Filtration Apparatus. It should be understood that other methods for disposing of or recovering copper from copper bearing waste 516 are also contemplated by the present invention. Copper free waste 518 is optionally sent to a waste treatment/processing apparatus 522, such as that according to the present invention as described with reference to FIGS. 4 and 5. Again, it should be understood that other methods for treating and/or disposing of copper free waste 518 are contemplated by the present invention.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. A method for selectively removing metal ions of interest from a solution, comprising contacting a solution containing solid particles, an oxidizing agent and a first concentration of the metal ions with an ion-exchange resin that is resistant to damage by the oxidizing agent and that is operative when in contact with the solution to exchange selected ones of the metal ions in the solution for selected preferred ions thereby to produce a treated solution having a second concentration of the metal ions that is lower than the first concentration.

2. A method according to claim 1 wherein the solution contains solid particles having a size distribution of from 0.02 micron to 0.10 micron.

3. A method according to claim 1 wherein the solution is wastewater from a chemical mechanical polishing process.

4. A method according to claim 1 wherein the metal ions of interest are copper ions.

5. A method according to claim 1 wherein said ion-exchange resin comprises a plurality of ion-exchange resin beads contained in a resin vessel thereby to define a resin bed, and wherein the step of contacting is accomplished by passing the solution in an up-flow direction through said resin vessel thereby to expand the resin bed.

6. A method according to claim 5 wherein the resin bed is expanded by 10% to 60%.

7. A method according to claim 1 wherein said ion-exchange resin is a crosslinked poly-4-vinylpyridine resin.

8. A method according to claim 7 wherein said ion-exchange resin is selected from the group consisting of Reillex 402 and Reillex 425 resins.

9. A method according to claim 1 including the step of contacting the ion-exchange resin with a regenerant solution operative to exchange ions therein for the metal ions of interest contained in the ion-exchange resin, thereby to form a regenerant waste solution containing a salt of the metal ions of interest.

10. A method according to claim 9 wherein the regenerant solution is selected from the group consisting of an acid solution and a base solution.

11. A method according to claim 10 wherein said acid solution is sulfuric acid and wherein said base solution is ammonium hydroxide.

12. A method according to claim 9 wherein the regenerant waste solution is passed to an electrowinning cell that is operative to reduce the metal ions to their corresponding elementary metal.

13. A method according to claim 9 including the step of contacting the ion-exchange resin with a first rinse solution thereby to form a second rinse solution.

14. A method according to claim 13 wherein the first rinse solution is de-ionized water.

15. A method according to claim 13 wherein the second rinse solution is passed to a regenerant source vessel, and including the step of adding a regenerant concentrate to the second rinse solution in the regenerant source vessel thereby to form the regenerant solution in the regenerant source vessel.

16. A method according to claim 1 wherein said second concentration of metal ions is substantially zero.

17. A method according to claim 1 including the steps of adjusting the pH and oxidation-reduction potential of said treated solution.

18. A method according to claim 1 including the step of filtering the treated solution by reverse osmosis thereby to produce a retentate and a permeate.

19. A method according to claim 18 including the step of adding a reducing agent to the treated solution prior to the step of filtering.

20. A method according to claim 18 including the step of passing the permeate through an electro-deionization system.

21. A method according to claim 18 including the step of passing the permeate through a UV/vacuum degasification system.

22. A method according to claim 18 including the step of adding water to the permeate.

23. A method for selectively removing metal ions of interest from a solution containing the metal ions, solid particles and an oxidizing agent without removing the solid particles and oxidizing agent from the solution, comprising contacting the solution with an ion-exchange resin that is resistant to damage by the oxidizing agent and that is operative when in contact with the solution to exchange the metal ions in the solution for selected preferred ions thereby to produce a treated solution containing the solid particles and the oxidizing agent.

24. A method for selectively removing copper ions from a solution containing the copper ions, solid particles and an oxidizing agent, comprising contacting the solution with a crosslinked poly-4-vinylpyridine ion-exchange resin.

25. A method for selectively removing copper ions from a solution containing the copper ions and aluminum ions, comprising contacting the solution with a crosslinked poly-4-vinylpyridine ion-exchange resin thereby to produce a treated solution containing the aluminum ions.

26. An apparatus for selectively removing metal ions of interest from a solution containing an oxidizing agent, solid particles and a first concentration of the metal ions, comprising:
    (a) an inlet adapted to receive the solution from a solution source;
    (b) a resin vessel in fluid communication with said inlet and adapted to receive the solution therefrom;
    (c) an ion-exchange resin disposed in said resin vessel, wherein said ion-exchange resin is resistant to damage by the oxidizing agent and is operative when in contact with the solution to exchange selected ones of the metal ions in the solution for selected preferred ions thereby to produce a treated solution having a second concentration of the metal ions that is lower than the first concentration;
    (d) a first outlet in fluid communication with the resin vessel and adapted to receive the treated solution therefrom;
    (e) a regenerant source in fluid communication with said resin vessel and operative to selectively provide thereto a regenerant solution that is operative when in contact with the ion-exchange resin to exchange ions in the regenerant solution for the metal ions of interest contained in the ion-exchange resin, thereby to form a regenerant waste solution containing a salt of the metal ions of interest;
    (f) a second outlet in fluid communication with said resin vessel and adapted to receive the regenerant waste solution therefrom; and
    (g) a valve system comprising a plurality of valves associated with a plurality of fluid pathways interconnecting selected ones of said inlet, said resin vessel, said regenerant source and said first and second outlets, whereby in a first state said valve system permits fluid flow through said inlet, through said resin vessel and through said first outlet thereby to define a first fluid pathway, and in a second state said valve system permits fluid flow from said regenerant source, through said resin vessel and through said second outlet thereby to define a second fluid pathway.

27. An apparatus according to claim 26 wherein said second outlet is adapted to be placed in fluid communication with an electrowinning cell and to provide the regenerant waste solution thereto.

28. An apparatus according to claim 26 including a rinse source in fluid communication with said resin vessel and operative to provide a rinse solution thereto, and wherein said valve system includes a third state whereby said valve system permits fluid flow from said rinse source, through said resin vessel and to said regenerant source thereby to define a third fluid pathway.

29. An apparatus according to claim 26 including a reservoir adapted to receive said treated solution from said first outlet, and including a pH monitor operative to monitor a pH of said treated solution in said reservoir and an oxidation-reduction potential monitor operative to monitor an oxidation-reduction potential of said treated solution in said reservoir, and including an acid source, a base source and a reducing agent source each in fluid communication with said reservoir, whereby said pH monitor is capable of selectively signaling said acid source and said base source to provide acid and base respectively to said reservoir thereby to attain a target pH of said treated solution in said reservoir, and whereby said oxidation-reduction potential monitor is capable of signaling said reducing agent source to provide a reducing agent to said reservoir thereby to attain a target oxidation-reduction potential of said treated solution in said reservoir.

30. An apparatus according to claim 29 wherein said reservoir is in fluid communication with a sewer and is operative to provide said treated solution thereto.

31. An apparatus according to claim 26 including a reservoir adapted to receive said treated solution from said first outlet, and including a reducing agent source in fluid communication with said reservoir and operative to provide a reducing agent thereto, a reverse-osmosis device in fluid communication with said reservoir and adapted to receive said treated solution therefrom and operative to filter said treated solution thereby to produce a retentate and a permeate, a UV/vacuum degasification unit in fluid communication with said reverse-osmosis device and adapted to receive said permeate therefrom and operative to remove organic materials present in said permeate thereby to produce purified water, and an electro-deionization unit in fluid communication with said UV/vacuum degasification unit and adapted to receive said purified water therefrom and operative to exchange saline ions present in said purified water for ions selected from the group consisting of hydrogen or hydroxyl ions thereby to produce high purity water.

32. An apparatus according to claim 31 wherein said reverse osmosis device includes a first-stage reverse osmosis element operative to filter said treated solution thereby to produce a first-stage retentate and a first-stage permeate, and wherein said reverse osmosis device includes a second-stage reverse osmosis element operative to filter said first-stage permeate into a second-stage retentate and said permeate.

33. An apparatus for selectively removing metal ions of interest from a solution containing an oxidizing agent, solid particles and a first concentration of the metal ions, comprising:
(a) an inlet adapted to receive the solution from a solution source;
(b) a first resin vessel in fluid communication with said inlet and adapted to receive the solution therefrom;
(c) a first ion-exchange resin disposed in said first resin vessel, wherein said first ion-exchange resin is resistant to damage by the oxidizing agent and is operative when in contact with the solution to exchange selected ones of the metal ions in the solution for selected preferred ions thereby to produce a treated solution having a second concentration of the metal ions that is lower than the first concentration;
(d) a second resin vessel in fluid communication with said inlet and adapted to receive the solution therefrom;
(e) a second ion-exchange resin disposed in said second resin vessel, wherein said second ion-exchange resin is resistant to damage by the oxidizing agent and is operative when in contact with the solution to exchange selected ones of the metal ions in the solution for selected preferred ions thereby to produce a treated solution having a second concentration of the metal ions that is lower than the first concentration;
(f) a first outlet in fluid communication with said first resin vessel and said second resin vessel and adapted to selectively receive the treated solution therefrom;
(g) a regenerant source in fluid communication with said first resin vessel and said second resin vessel and operative to selectively provide thereto a regenerant solution that is operative when in contact with the first and second ion-exchange resin respectively to exchange ions in the regenerant solution for the metal ions of interest contained in the first and second ion-exchange resin respectively, thereby to form a regenerant waste solution containing a salt of the metal ions of interest;
(h) a second outlet in fluid communication with said first resin vessel and said second resin vessel and adapted to selectively receive the regenerant waste solution therefrom; and
(i) a valve system comprising a plurality of valves associated with a plurality of fluid pathways interconnecting selected ones of said inlet, said first and second resin vessel, said regenerant source and said first and second outlets, whereby in a first state said valve system permits fluid flow through said inlet, through said first resin vessel and through said first outlet thereby to define a first fluid pathway, and permits fluid flow from said regenerant source, through said second resin vessel and through said second outlet thereby to define a second fluid pathway, and in a second state said valve system permits fluid flow through said inlet, through said second resin vessel and through said first outlet thereby to define a third fluid pathway, and permits fluid flow from said regenerant source, through said first resin vessel and through said second outlet thereby to define a fourth fluid pathway.

34. An apparatus according to claim 33 including a rinse source in fluid communication with said first and second resin vessel and operative to provide a rinse solution thereto, and wherein said valve system includes a third state whereby said valve system permits fluid flow from said rinse source, through said first resin vessel and to said regenerant source thereby to define a fifth fluid pathway and permits fluid flow along said third fluid pathway, and wherein said valve system includes a sixth state whereby said valve system permits fluid flow from said rinse source, through said second resin vessel and to said regenerant source thereby to define a fifth fluid pathway and permits fluid flow along said first fluid pathway.

35. A system for removing metal ions of interest from a solution containing solid particles, an oxidizing agent and a first concentration of the metal ions, comprising:
(a) a solution source operative to provide the solution containing the solid particles, the oxidizing agent and the first concentration of the metal ions;
(b) an ion-exchange apparatus in fluid communication with the solution source and operative to receive the solution therefrom, wherein the ion-exchange apparatus includes an ion-exchange resin that is resistant to damage by the oxidizing agent and that is operative when in contact with the solution to exchange selected ones of the metal ions in the solution for selected preferred ions thereby to produce a treated solution having a second concentration of the metal ions that is lower than the first concentration, and wherein the ion-exchange apparatus includes a regenerant source operative to provide a regenerant solution that is operative when in contact with the ion-exchange resin to exchange ions in the regenerant solution for the metal ions of interest contained in the ion-exchange resin, thereby to form a regenerant waste solution containing a salt of the metal ions of interest; and
(c) a metal recovery apparatus in fluid communication with said ion-exchange apparatus and adapted to receive the regenerant waste solution therefrom, wherein the metal recovery apparatus is operative to recover the metal ions of interest from the regenerant waste solution.

36. A system according to claim 35 including a waste processing apparatus in fluid communication with said ion-exchange apparatus and adapted to receive said treated solution therefrom, wherein said waste processing apparatus includes at least one device selected from the group consisting of a reverse-osmosis device, a UV/vacuum degasification device and an electro-deionization device, wherein said waste processing apparatus is operative to remove contaminants from said treated solution thereby to produce high purity water.

37. A system according to claim 35 including a waste processing apparatus in fluid communication with said ion-exchange apparatus and adapted to receive said treated solution therefrom, wherein said waste processing apparatus is operative to adjust a pH of said treated solution to a target pH and is operative to adjust an oxidation-reduction potential of said treated solution to a target oxidation-reduction potential.

38. A system according to claim 35 wherein said metal recovery apparatus is an electrowinning cell operative to reduce the metal ions in the regenerant waste solution to their corresponding elementary metal.

* * * * *